UNITED STATES PATENT OFFICE.

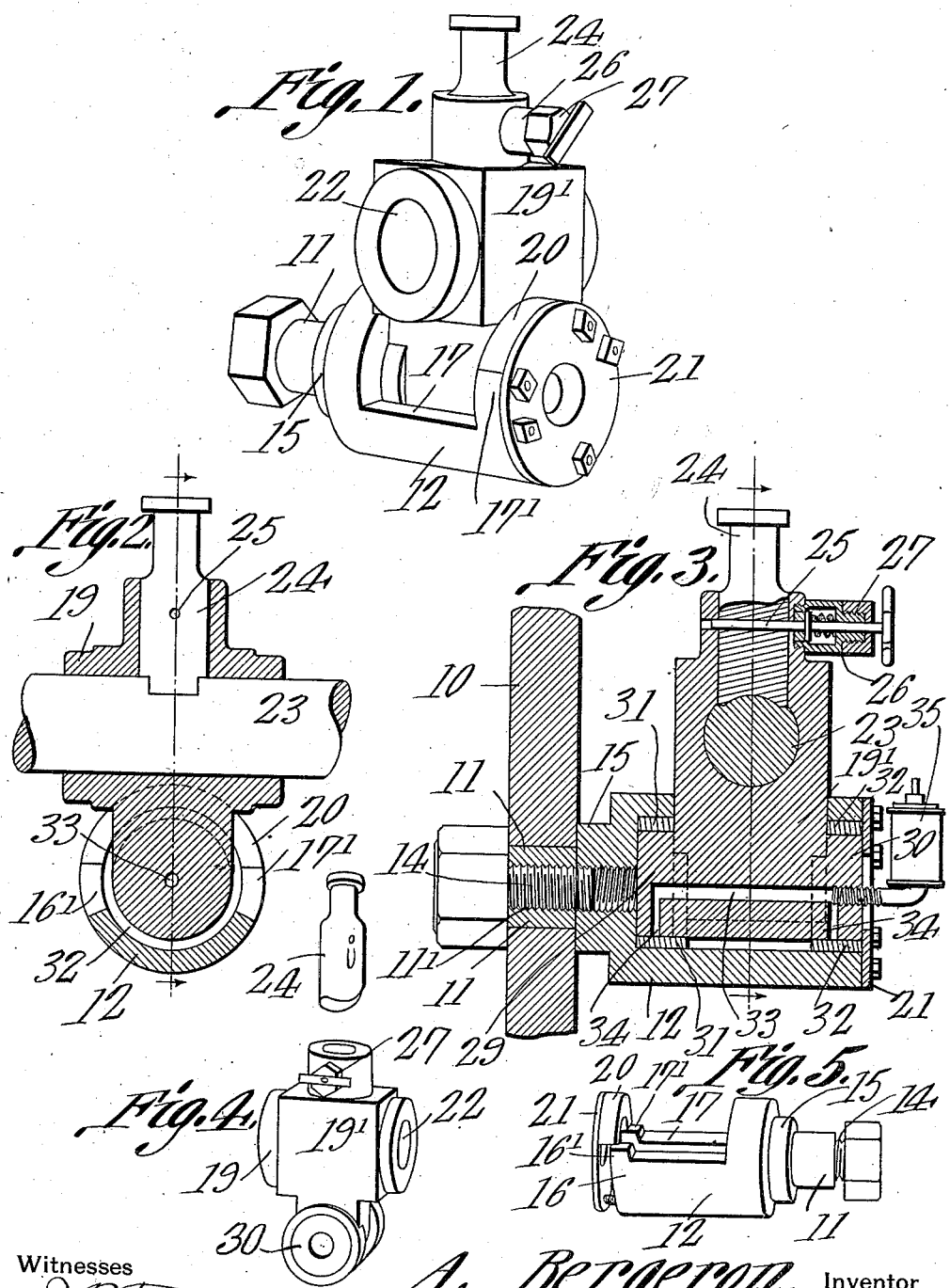

ARTHUR BERGERON, OF MONTREAL, WISCONSIN.

VALVE-ROD AND WRIST-PIN CONNECTION.

1,011,148.  Specification of Letters Patent.  Patented Dec. 12, 1911.

Application filed April 28, 1911. Serial No. 623,850.

*To all whom it may concern:*

Be it known that I, ARTHUR BERGERON, a citizen of the United States, residing at Montreal, in the county of Iron and State of Wisconsin, have invented a new and useful Valve-Rod and Wrist-Pin Connection, of which the following is a specification.

This invention relates to an improvement in coupling devices for coupling the valve rod and wrist plate in a valve gear of the Corliss type.

The primary object of the invention is to provide a coupling device of this character which will effectually transmit the movement of the valve rod to the wrist plate, the wear occasioned by the rocking movement being taken up by bearings which may be conveniently removed and replaced.

In the drawings: Figure 1 is a perspective view of the coupling. Fig. 2 is a vertical section. Fig. 3 is a longitudinal section. Fig. 4 is a perspective view of the rod receiving head, and Fig. 5 is a perspective view of the bearing which is rigidly connected to the wrist plate.

In the drawings, 10 designates the wrist plate through which extends the reduced portion 11 of a cylindrical bearing 12. Said reduced portion being formed with the screw threaded bore 11′ which receives the screw 14, the head of which when tightened securely clamping the wrist plate 10 to the shoulder 15 of the cylindrical bearing. A portion of the cylindrical bearing is removed, the bearing being a true cylinder only adjacent the end which is formed with the extension 11, the parallel side walls 16 and 17 being formed with lugs 16′ and 17′. The end portion of the cylinder being normally open to receive the body portion and trunnions of a rod supporting head 19. When this head has been placed in position within the bearing, a semi-circular block 20 which has its end portions in contact with the lugs 16′ and 17′, is secured to the open end of the cylinder, said block forming a continuation of said lugs, and being held in place by means of the plate 21 which is bolted or otherwise secured to the body portion of the bearing, the block being also secured to said plate by means of bolts. This structure effectually locks the head 19 against removal.

The head 19 consists of the body portion 19′ which is formed with a bore 22 which receives the rod 23, a hollow boss extending at right angles to the body portion 19, said boss receiving the locking pin 24, the contacting end of which is concaved to straddle the rod 23, the rod 23 being reduced to receive the end portion of said pin. A second and smaller pin 25 passes transversely through the pin 24 to prevent the accidental displacement of said pin, this rod or pin 25 being spring pressed, the spring being arranged within a housing 26, the end portion of the rod being provided with a knob by which the same may be withdrawn, suitable jam nuts 27 surrounding said rod and bearing against the housing. The head is provided adjacent its other end with trunnions 29 and 30 one of which extends beneath the end portion of the cylindrical bearing 12, said trunnions being of a diameter which will permit of the insertion of the annular bearings 31 and 32, the head being permitted to rotate, the wear incidental to said rotation being taken up by said bearings. These bearings may be of Babbitt metal or other material and may be conveniently removed when the same become worn. The head 19 adjacent its trunnioned ends is provided with an oil duct 33 from which the oil is conducted to the bearing by means of the radially extending passages 34, the oil or lubricant being fed from a grease cup or reservoir 35 supported either by the trunnion adjacent the plate 21 or by said plate.

It will be noted by this construction that a simple and compact coupling is provided which will effectually transmit the rocking motion desired, the wear incidental to said rocking motion being taken up by bearings which may be conveniently removed.

Attention is called to the fact that the connection may be quickly and conveniently detached but while secured within the head accidental displacement is positively prevented.

It will be seen that all of the parts may be easily and economically manufactured, the construction being such that said parts may be readily assembled.

What is claimed is:

1. In a device of the class described, a valve rod, a wrist plate, a cylindrical member secured to said wrist plate, a head supported for movement by said cylindrical member, said head being formed with trunnions, and a plurality of annular bearings spacing said trunnions from the walls of said cylindrical member, said head being arranged to receive said valve rod.

2. In a device of the class described, a wrist plate, a valve rod, a cylindrical member secured to said wrist plate, said member being reduced longitudinally, a rod supporting head, said head being formed with trunnions arranged to extend longitudinally within said cylindrical member, the cylindrical member being formed with a removable end, and a member carried by said removable end, said member forming a continuation of the wall of the cylindrical member.

3. In a device of the class described, a wrist plate, a valve rod, a rod supporting head, a cylindrical member, said member being reduced longitudinally and provided with an open end, the reduced portion of said member adjacent said open end being formed with lugs, a semi-circular member contacting with said lugs and forming a continuation of said cylindrical member and a plate surrounding said semi-circular member, said plate being secured to the end portions of the cylindrical member.

4. In a device of the class described, a valve rod, a wrist plate, a cylindrical member secured to said plate, said cylindrical member being reduced longitudinally and provided with an open end, a rod supporting head, said head being formed with trunnions arranged to extend longitudinally within said cylindrical member, a semi-circular member forming a continuation of the cylindrical member at a point adjacent its open end, said semi-circular member and said cylindrical member inclosing said trunnions and bearings interposed between said trunnions and said cylindrical member, said head being formed with a transversely disposed oil passage.

In testimony that I claim the foregoing as my own, I have hereto affixed my signature in the presence of two witnesses.

ARTHUR BERGERON.

Witnesses:
J. A. SULLIVAN,
JOSEPH CARRIER.

Copies of this patent may be obtained for five cents each, by addressing the "Commissioner of Patents, Washington, D. C."